United States Patent [19]

Layer

[11] Patent Number: 5,372,236

[45] Date of Patent: Dec. 13, 1994

[54] ROTARY CONVEYOR SINGULATION SYSTEM

[75] Inventor: John K. Layer, Corydon, Ind.

[73] Assignee: Ziniz, Inc., Louisville, Ky.

[21] Appl. No.: 136,577

[22] Filed: Oct. 13, 1993

[51] Int. Cl.⁵ .......................................... B65G 47/22
[52] U.S. Cl. ................................. 198/392; 198/443
[58] Field of Search ................... 198/392, 443, 450

[56] References Cited

U.S. PATENT DOCUMENTS

| | | | |
|---|---|---|---|
| 1,862,351 | 6/1932 | Hagiwara | 198/392 |
| 2,941,651 | 6/1960 | Hutter et al. | 198/392 X |
| 3,049,215 | 8/1962 | Hutter et al. | 198/443 |
| 3,392,816 | 7/1968 | Cox | 198/392 X |
| 3,726,385 | 4/1973 | Sterling | 198/392 |
| 4,007,854 | 2/1977 | Ervine | 198/392 X |
| 4,768,639 | 9/1988 | Gamberini et al. | 198/392 |
| 4,921,106 | 5/1990 | Spatafora et al. | 209/539 |
| 5,044,487 | 9/1991 | Spatafora et al. | 198/392 |
| 5,065,852 | 11/1991 | Marti | 198/392 |
| 5,186,305 | 2/1993 | Everett | 198/392 |

FOREIGN PATENT DOCUMENTS

| | | | |
|---|---|---|---|
| 0231307 | 9/1990 | Japan | 198/392 |
| 0833909 | 5/1960 | United Kingdom | 198/443 |
| 2184105 | 6/1987 | United Kingdom | 198/392 |
| 0603561 | 4/1978 | U.S.S.R. | 198/392 |
| 1294563 | 3/1987 | U.S.S.R. | 198/392 |

Primary Examiner—James R. Bidwell
Attorney, Agent, or Firm—Camoriano & Smith

[57] ABSTRACT

An apparatus having a rotary member which utilizes various forces acting upon articles when rotated on a surface of the member for singulating the articles. The rotary member has a surface that forms an angle $\theta$ to a horizontal plane where the angle $\theta$ is between about 0° and 200°. A motor and coupling elements couple the motor to the surface and the surface is rotated about an axis at about 10 to 15 RPM. The surface of the device has a coefficient of friction with respect to the articles such that the articles entering onto the surface at the region of ingress are moved toward a stationary wall circumscribing the surface. Outboard articles, i.e., articles that are lodged in an abutting relationship with the wall, are translated while the inboard stacked articles, i.e., articles against which the outboard articles are stacked and abut the wall, remain in a temporary but relatively motionless condition such that the outboard articles tend to move with the rotating surface and become singulated before a region of egress is reached.

11 Claims, 8 Drawing Sheets

ROTARY CONVEYOR SINGULATION SYSTEM

BACKGROUND OF THE INVENTION

The present invention relates to an apparatus and system for the orienting of a multiplicity of articles into a single file for further handling and identification.

The process of organizing articles into single file or serial order is called "singulation". Industry is placing great demands on sorting apparatus to perform singulation with a high degree of efficiency in short time period in the minimum of space. Bar coders and the like require the articles to be arranged serially in close proximity to the identifying devices. Prior art attempts to meet the demand for accuracy and efficiency have often been frustrated by a "stacking" problem. Stacking is defined as the abutting of articles as opposed to being lined serially. In airport rotary conveyors stacking is manifested in luggage being positioned in an abutting relationship away from the side rail making it difficult for the passenger to retrieve the "outboard" piece of luggage. It is clearly desirable in a luggage retrieving system that the luggage be arranged serially or otherwise singulated. By analogy it is desirable for articles in high number article handling systems as with packages being arranged in a warehouse or an express mail handling room to be singulated to a high degree of accuracy without stacking in order to facilitate further processing.

SUMMARY OF THE INVENTION

The present invention provides for the singulation of a multiplicity of articles between a point of ingress and a point of egress through the recognition of and proper utilization of the various forces acting upon such articles when rotated on a surface about a central axis. The device of the present invention comprises a member having a surface forming an angle $\theta$ to a horizontal plane where the angle $\theta$ is between about 0° and 20°. A motor and coupling elements couple the motor to the surface and the surface is rotated about an axis at about 10 to 15 RPM. The surface of the device has a coefficient of friction with respect to the articles such that the articles entering onto the surface at the region of ingress are moved toward a stationary wall circumscribing the surface. Outboard articles, i.e., articles that are lodged in an abutting relationship with the wall, are translated while the inboard stacked articles, i.e., articles against which the outboard articles are stacked and abut the wall, remain in a temporary but relatively motionless condition such that the outboard articles tend to move with the rotating surface and become singulated before the region of egress is reached.

BRIEF DESCRIPTION OF THE DRAWING

FIG. 1A is a plan view in schematic form of a truncated conical device of the present invention indicating that the slope angle is variable;

FIG. 1B is a view taken along lines 1B—1B of FIG. 1A showing a side elevation view of the device at the radial midline of the region of article ingress;

FIG. 1C is a view taken along lines 1C—1C showing a side elevation view of the device at the radial line indicating the start of the region of article ingress toward the discharge chute;

DETAILED DESCRIPTION OF THE PREFERRED EMBODIMENT

In developing the singulator system of the present invention, applicant was aware of several significant prerequisites that require careful balancing in order to ensure satisfactory and practical singulation to occur. First, numerous articles of various sizes must be handled with consideration being given to the momentum generated by the articles moving down the rotating singulator surface due to the gravitational and centrifugal forces acting upon the articles and the force of impact at the side rail. Clearly too large an impact force would be detrimental to the articles. Second, acceptable levels of package singulation must occur within practical limits of rotation of the singulator surface. That is, package rotation of 360° or back to the entry point of the articles on to the singulator surface is clearly not desirable. Singulation must occur by the time the surface has reached the point of package discharge which is less than the 360° rotation of the singulator surface, preferably 270° or less. Finally, the singulated articles upon discharge must be within an acceptable distance of a side of the discharge area. This is to ensure that the singulated packages are sufficiently close to such side for further handling and identification.

Applicant has determined that the above prerequisites for acceptable singulation are dependent to a large extent upon the use and balancing of gravitational, centrifugal and frictional forces acting upon the articles during the time interval between article entry and article exit. By proper selection of rotational speeds of the singulator device surface and slope angles, i.e., the angle of the singulator surface with the horizontal plane, applicant further has determined that the impact force can be minimized (in some instances with the assistance of a buffering rail structure), that acceptable levels of singulation can be reached within the practical limitations of surface rotation, and that distances between the singulated articles and discharge chute side rails can be held within acceptable minimum ranges.

Figure 1:
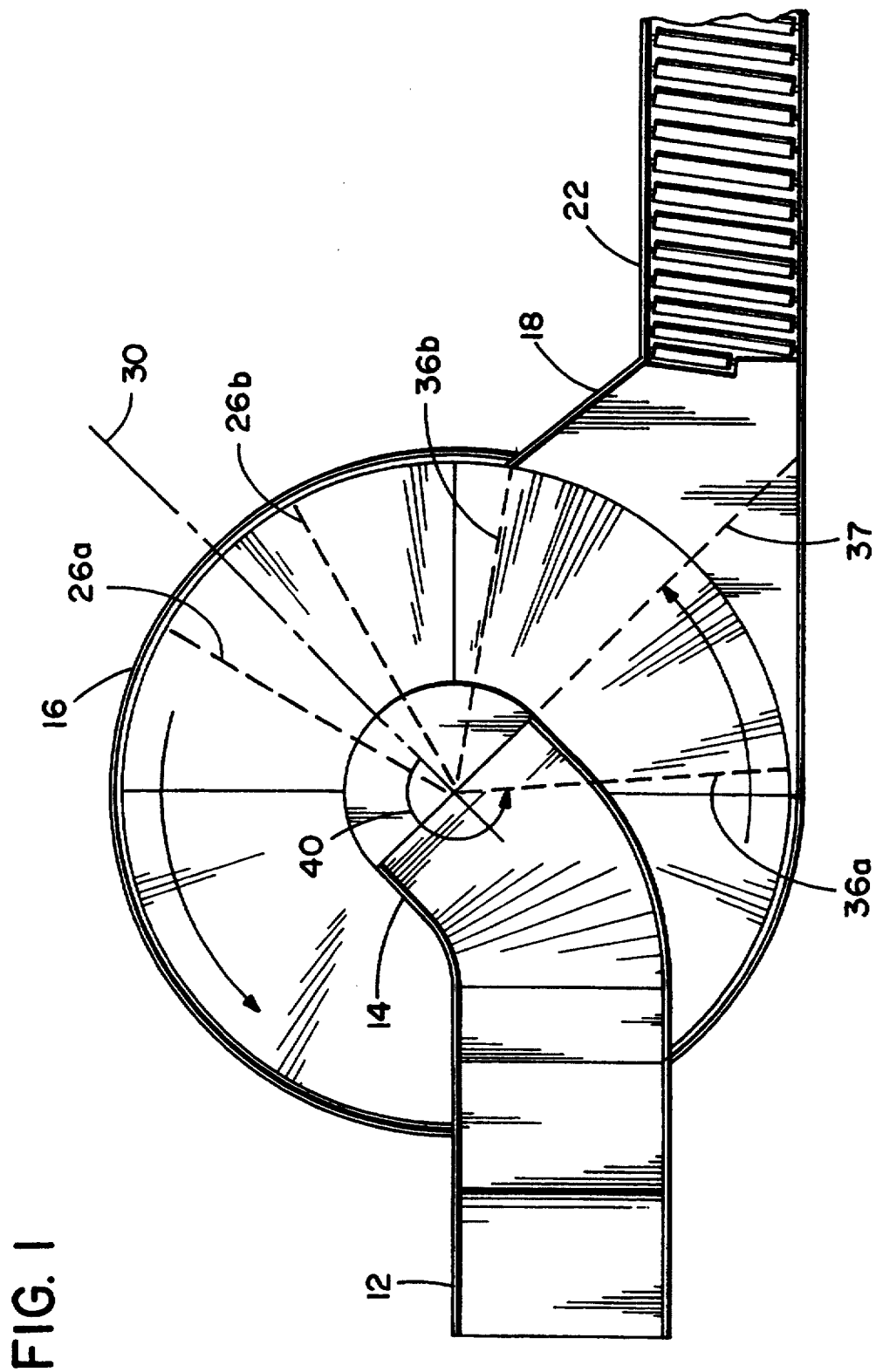
FIG. 1 is a plan view in schematic form of the present invention illustrating an article singulator system comprising an entry conveyor, an entry chute, a truncated conical singulator device, a discharge chute, and a discharge conveyor.
Figure 2:
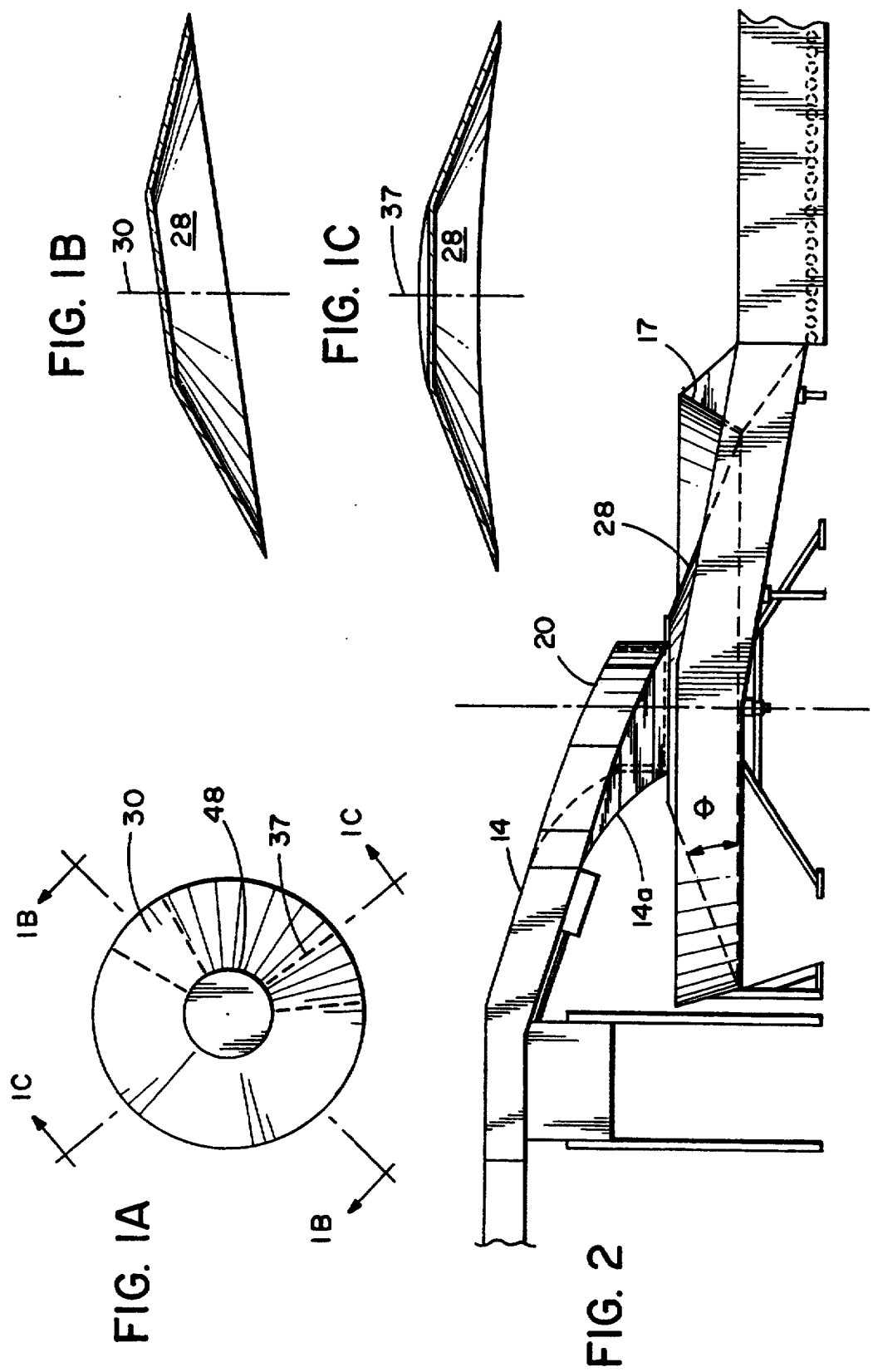
FIG. 2 is a side view of the system of FIG. 1 showing the curvature of the entry chute into the singulator device and the slope of the discharge chute toward the discharge conveyor.
Figure 3:
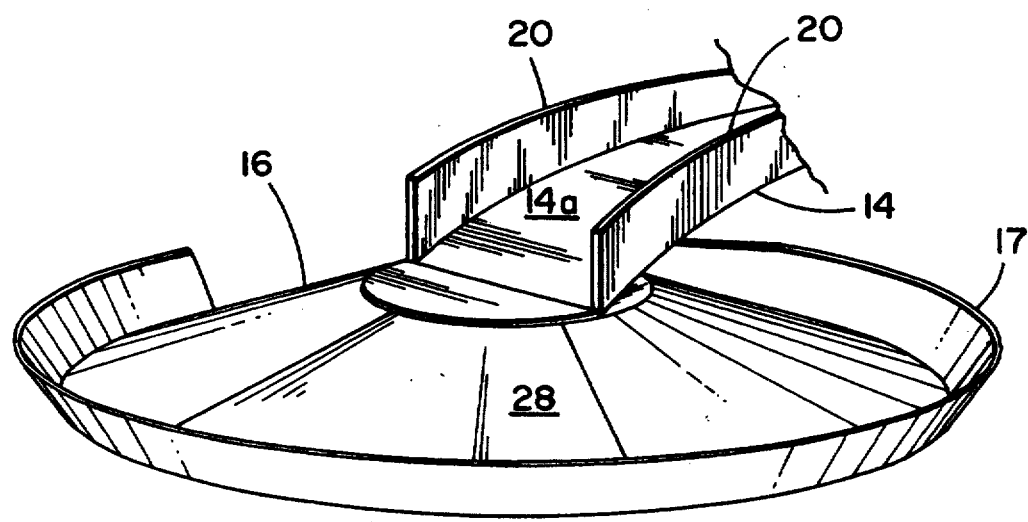
FIG. 3 is a perspective of a portion of the entry chute feeding into the singulator device.

In the views of FIGS. 1-3, the singulator system of the present invention may be seen as having several major elements. An entry conveyor 12 carries a group of articles to an entry chute 14 that in turn empties the articles into the top of a singulator device 16. Singulator device 16 rotates in a counter clockwise direction with the articles being singulated as described hereinafter and simultaneously carries the articles to a discharge chute 18 that discharges the articles into a discharge conveyor 22. While the exact type and details of the conveyor used as entry conveyor is unimportant for an understanding of the present invention, entry conveyor 14 may be a belt conveyor as shown in FIG. 2. As will be discussed below, it may be desirable to employ a conveyor that will assist in the movement of articles from the singulator device 16 to the side rail of the discharge conveyor to facilitate further handling. Thus, discharge conveyor 22 may advantageously be a skewed roller conveyor at least along the first section thereof for moving packages to the side rail thereof.

Entry chute 14, best seen in FIGS. 2 and 3, has a bottom surface 14a which forms a surface extension of the downwardly inclined section of conveyor 12. Surface 14a is integral to a pair of side walls 20. The entire chute 14 spirals downwardly in counterclockwise fashion toward the sloping singulator surface 28 of singulator device 16. A circumferentially extending, side wall or rail 17 forms a boundary and is substantially perpendicular to the lower portion of sloping surface 28. The region bounded by dashed radial lines 26a and 26b in FIG. 1 represents the surface area of surface 28 immediately below chute 14 and is known as the "ingress" region for articles entering singulator device 16. A radial line 30 essentially bisecting this denotes the center thereof. A region of "egress" is defined by the boundary of surface 28 with the downward sloping surface of discharge chute 18 and is depicted between dashed radial lines 36a and 36b. The midline of the region of egress is shown by dashed radial line 37. The angle of rotation between radial lines 30 and 36a is called the "angle of displacement" and is pointed out by character numeral 40. Within the angle of displacement, singulation to acceptable levels must occur. Applicant has determined that the range of angle of displacement at RPM and slope levels as chosen for acceptable levels of article singulation lies between about 90° and 270°, preferably between about 120° and 270°. The upper portion of the range is largely dictated by practical considerations since discharge must occur prior to reaching the region of ingress. Singulation does not occur to acceptable levels for angles of displacement less than about 90° due to the inability of the articles to completely articulate and reach the singulator device side rail before being carried to the egress region.

Figure 4:
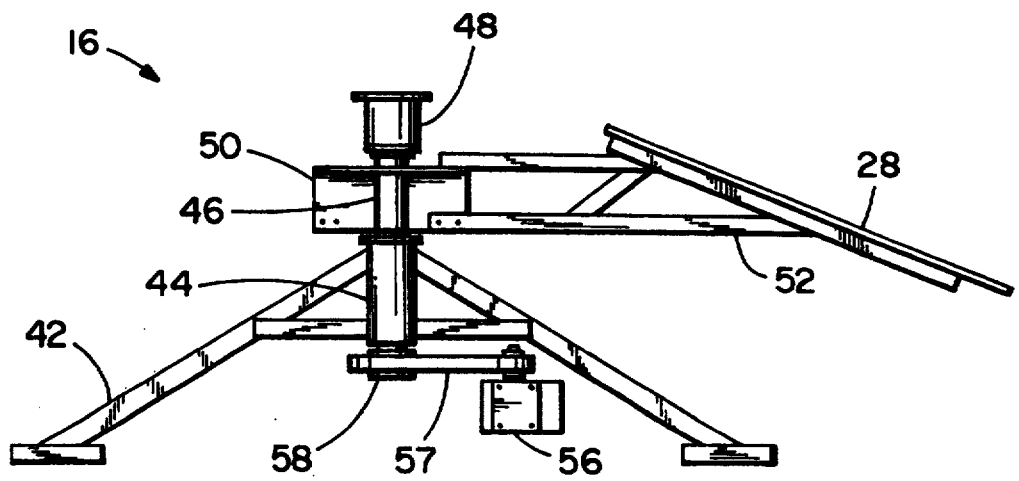
FIG. 4 is a side view in schematic form of the motor and support structure for the singulator device of FIG. 1.

Because a detailed description of supporting and drive structure for singulator device 16 is not necessary for an understanding of the present invention, such structure is depicted in schematic form in the side elevation view of FIG. 4. However, it should be understood that other structures supporting and rotating a singulator device may be employed as well without departing from the invention as described herein. Basically, singulator device 16 may comprise a base supporting structure 42 supporting a bearing hub 44. A rotatable support shaft 46 has its lower end housed within hub 44 and its upper end housed within and supporting a bearing hub 48. Hub 48 is secured to and supports the underneath structure of spiral chute 14 (not shown in FIG. 3 for the sake of clarity). Rotary slide support bracket 50 fixed to shaft 46 serves to support a plurality of radially extending spokes 52 secured to the underneath portion of surface 28. A gear motor 56 mounted to base supporting structure 42 is provided with a belt drive 57 connected about a pulley 58 fixed to the lower distal end of shaft 46 to rotate singulator device 16 at a predetermined RPM.

Figure 7:
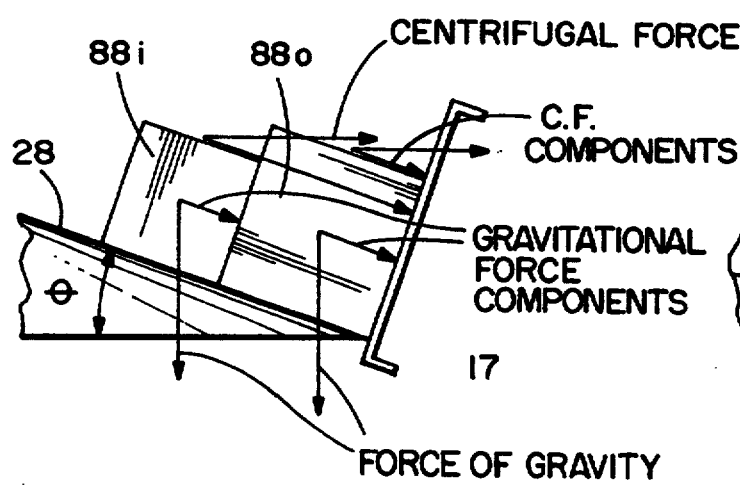
FIG. 7 is a schematic illustrating a pair of articles in a stacked condition and setting forth the various forces in vector form acting upon the articles.
Figure 8:
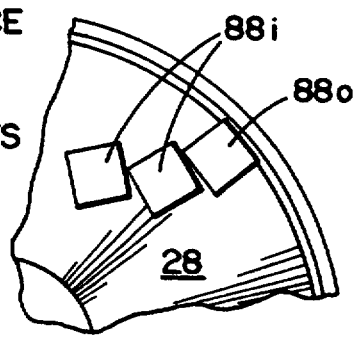
FIG. 8 is a top schematic view illustrating the translation of the inboard articles.

Singulator device surface 28 has a slope angle $\theta$ with respect to the horizontal plane as best seen in FIGS. 2 and 7. The slope angle $\theta$ plays an important role in the singulation procedure. When the angle is too steep, tumbling of the articles may occur and large impact forces may be generated when the articles impact against the side rail. Frictional forces at the side rail also are increased due to the high gravitational force component and singulation may thus be impeded.

On the other hand, if the slope angle is made too shallow, then the frictional forces between the articles and the surface of the conveyor must be made very small in order for the articles to slide toward the side rail or the RPM of the singulator device 16 must be increased substantially so as to increase the centrifugal force acting on the articles to cause movement thereof toward and against the side rails thereof. Additionally, the desired levels of singulation may not occur until device 16 rotates beyond an acceptable upper range limit of the angle of displacement. Finally, if the slope angle is too shallow at the egress area of device 16, then the articles remain on surface 28 longer and are discharged on to the discharge chute surface at a point too far from the chute side rail. To compensate for the shallow angle the RPM of device 16 would have to be increased to increase the centrifugal force so as to cause the articles to move more rapidly on to the discharge chute surface and nearer to the side rail thereof.

Figure 5:
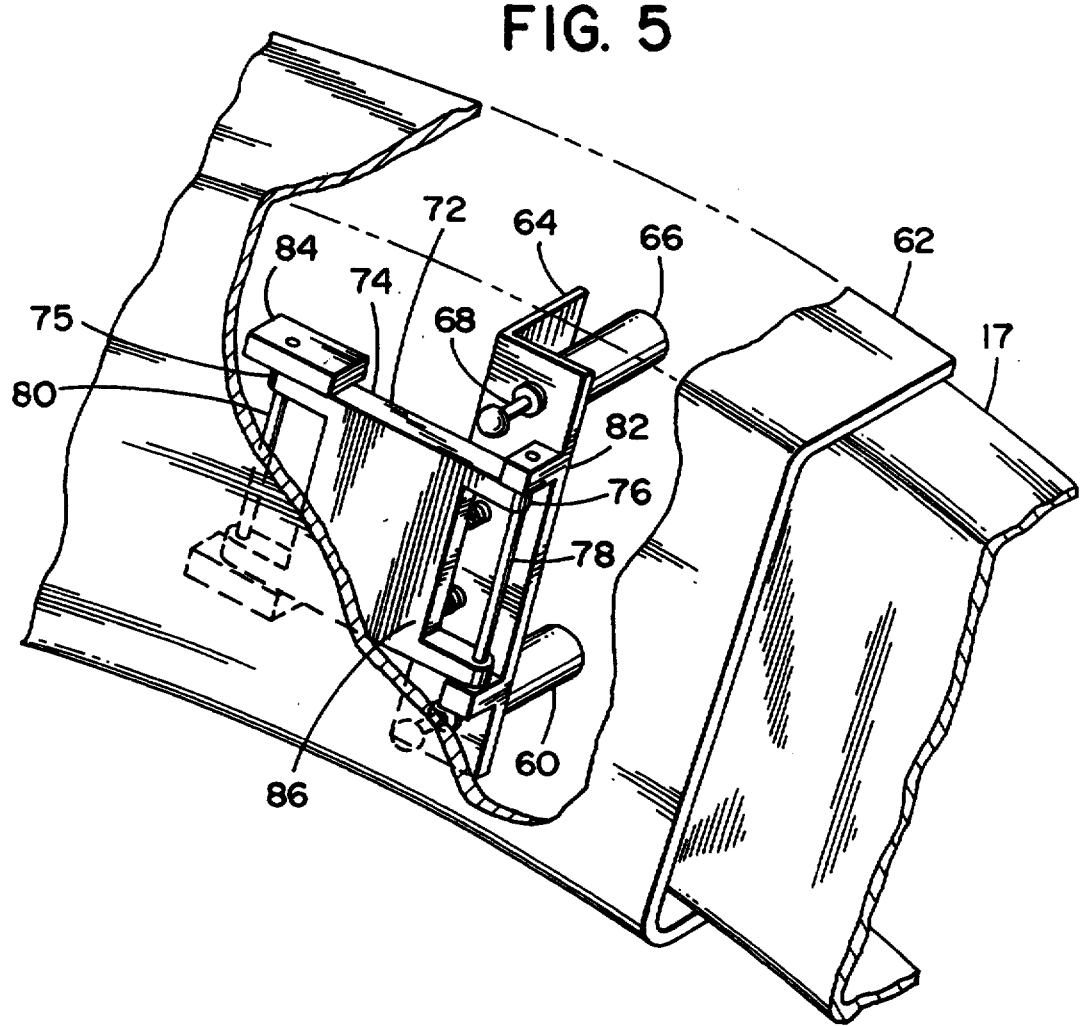
FIG. 5 is a isometrical view of a shock absorbing rail provided along a rail circumferentially abutting the base of the conical singulator device partially broken away to illustrate the shock absorbing mechanism.

FIG. 5 portrays an isometrical view, partially in section, of a shock absorbing rail mechanism showing the internal structure thereof which permits the kinetic energy of the articles sliding down surface 28 to be absorbed. The shock absorbing mechanism comprises a shock absorbing rail 62 having a C-shaped section that closely conforms to the periphery of rail 17 but is spaced a predetermined distance radially inward therefrom. The inwardly facing surface of rail 62 is essentially perpendicular to surface 28 of singulator device 16. Mounted within the space are a plurality of angle iron brackets 64 attached by the legs thereof in any well known manner to the inside surface of side rail 17. A pair of shock absorbers 66 are screwed into angle bracket 64. Plungers 68 of absorbers 66 extend through openings (not shown) in bracket 64 and abut the facing surface of rail 62.

The facing surfaces of rails 17 and 62 are linked together by a linkage assembly that comprises a link member 72 having a central body 74 and pairs of integral connecting legs 76 at the ends thereof pivotally attached to pins 78 and 80. The distal ends of pins 78 and 80 are supported by respective attachment blocks 82 and 84 mounted on the facing surfaces of rail 62 and bracket 64. Helical compression springs 86 are mounted between central body 74 and bracket 64. Thus, a radial component of force acting against rail 62, i.e. from the impact of articles moving downwardly on singulator device 16, is absorbed by shock absorbers 66 and rail 62 is urged by the biasing force of springs 86 back to the predetermined distance from rail 17.

As an alternative to the use of a shock absorbing side rail, applicant has found that the slope angle may be varied so as to provide a shallower slope angle in the area of article ingress while providing a steeper slope angle in the area of article egress onto the surface of the discharge chute. In this manner the force of article impact can be lessened while concurrently assuring that articles move from surface 28 to the surface of the discharge chute at the appropriate displacement angle and thus distance from the side rail thereof. One simple technique in accomplishing the slope angle variation is to cant device 16 in the manner schematically shown in FIGS. 1A, 1B, and 1C. As is seen in FIG. 1A in conjunction with FIG. 1C, the device 16 is canted such that the maximum slope angle is at the point of egress of the articles which is preferably at or near radial line 37. The cant of surface 28 may be seen in FIG. 1C by noticing the projection of the far side of the top portion of hub 48 over the near side. On the other hand the slope angle at the point of ingress is shallower as seen in FIG. 1B. Thus, the impact of articles against the side rail 17 in the region of ingress is smaller due to the lessened gravitational force component acting along surface 28. In contrast the gravitational force component along surface 28 is greater in the egress region encouraging the articles 88 to move into the discharge chute at a point nearer the chute side rail.

To explain the operation of the present invention, i.e., how singulation occurs, reference is made to the schematics of FIGS. 6, 6A, 7 and 8 showing the singulation of articles being moved by the conveyor system in accordance with the present invention. Generally, the structure of the present invention is designed so as to provide a dynamic interplay of the centrifugal, gravitational and frictional forces upon the articles to cause singulation to occur within an appropriate angle of displacement of singulator device 16. The magnitude of the component of the gravitational force is directly proportional to the mass of the article and to the slope of conveyor surface 28 while the magnitude of the component of the centrifugal force is directly proportional to the mass of the article and RPM of conveyor 16 and inversely proportional to the slope of conveyor surface 28. Since the frictional coefficients of articles against surface 28 and rail 17 are essentially constant from article to article, the rotation of conveyor surface 28 and its degree of slope can be adjusted within predetermined ranges to establish certain dynamic conditions to effectuate singulation.

Figure 6:
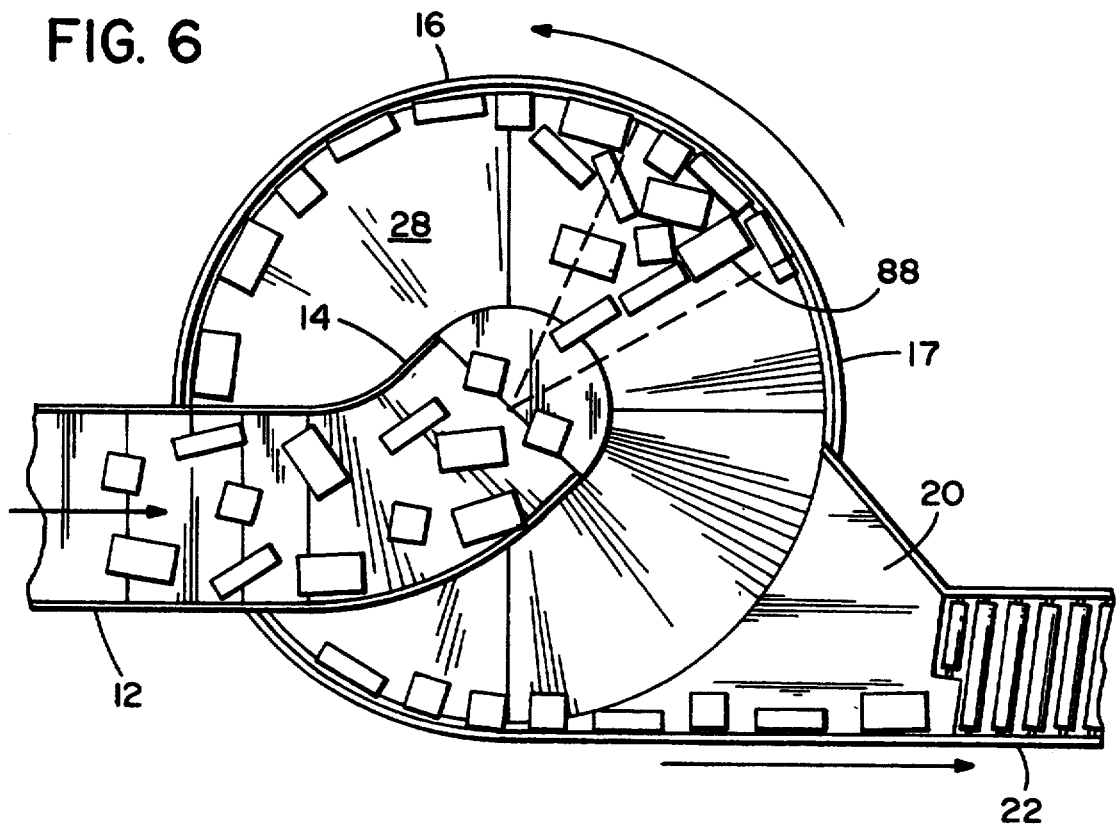
FIG. 6 is a plan view of the conveyor system of the present invention depicting the singulation progression of articles being conveyed by the rotating surface of the singulator device.

When articles are initially discharged from the inlet chute onto the surface of singulator device 16, articles 88 tend to initially slide directly down the surface until the frictional force between the article and the rotating surface causes the article to move with the surface. The path followed by the article is at first straight down the conveyor surface and then becomes more arcuate just before the articles impact against side rail 17. In some instances the arcuate path is sufficient for the articles to avoid impacting against preceding articles before resting against rail 17. However, in many instances, for example, when the population of the articles is large, some of the articles still quickly stack up against the side rail 17 in the ingress region below the inlet chute. A typical application of the present invention is in the sorting of packages destined for rapid delivery. Such application may require the handling of more than 10,000 articles an hour. The effect of stacking is best seen in FIG. 6.

A frictional force between side rail 17 and the "outboard" articles 88o, i.e., the articles laying against the side rail, opposes movement of articles 88o with rotating surface 28. The force vectors of gravitation and centrifugal forces acting on articles 88 are resolved in FIG. 7 into the component forces of each in the direction of the surface 28 and against side rail 17. The magnitude of the forces are not to scale. However, it can easily be seen that the magnitude of the rail frictional force of the outboard article 88o ("$F_r$'") is actually the sum of the combined gravitational force component acting along the conveyor surface toward rail 17 of both the inboard article 88i and outboard article 88o ("$F_g$") and the combined centrifugal forces of the two articles ("$F_c$") times the coefficient of friction between the outboard article 88o and rail 17 ($K_r$').

$$F_r = (F_g + F_c) \times K_r \tag{1}$$

Thus, for articles 88o to move at all, the frictional force between the slide surface and outboard article ("$F_{so}$") must be greater than the rail friction force $F_r$ as set forth below.

$$F_{so} > F_r \tag{2}$$

It is important that condition (2) be observed for each unstacked outboard article. However, in stacking situations, it is also important that stacked article 88o stick to rail 17. This condition (set forth below) is met when the cumulative rail friction force ($F_{rc}$) acting on stacked article 88o is greater than the slide friction force ($F_{so}$") acting on the outboard article 88o.

$$F_{so} < F_{rc} \tag{3}$$

Thus until condition (2) is reached the outboard articles in a stacked condition will remain motionless against rail 17. (In typical uses of rotating conveyors in airports for luggage retrieval the friction force at the rail never exceeds the friction force along the rotating surface or else the luggage never moves.) Finally, it is essential that condition (3) be temporary and relieved in sufficient time for singulation to occur before discharge. This is accomplished by assuring that the friction force experienced by inboard article 88i against outboard article 88o ("$F_{io}$") is less than the friction force exerted on inboard article 88i due to its interface with the rotating conveyor surface ("$F_{is}$"). When this condition (set forth below) is observed, inboard article 88i translates, i.e., moves, in the direction of the rotation of singulator surface 28 at nearly the angular speed thereof.

$$F_{io} < F_{is} \qquad (4)$$

Thus, applicant has found that by choosing certain values for the slope angle $\theta$ and speed of rotation of surface 28 certain dynamic physical conditions for articles conveyed on to the surface can be obtained that cause the articles to singulate in a requisite angle of displacement. The conditions are particularly applicable to articles having parallelpiped configurations as are normally handled in article handling situations. Such conditions allow individual articles which slide down the slope of surface 28 and then abut rail 17 to move with the rotating surface yet cause the same articles when in a stacked relationship with inboard articles to remain substantially motionless with respect to rail 17 until the stacked condition is relieved. The stacked condition is also made to be a temporary situation as the inboard articles in the stacked arrangement are translated in the direction of rotation with respect to the stacked outboard articles which are in a temporarily in a relative motionless condition. Once the stacked condition is ended the outboard articles then move with the conveyor surface 28.

Figure 6A:
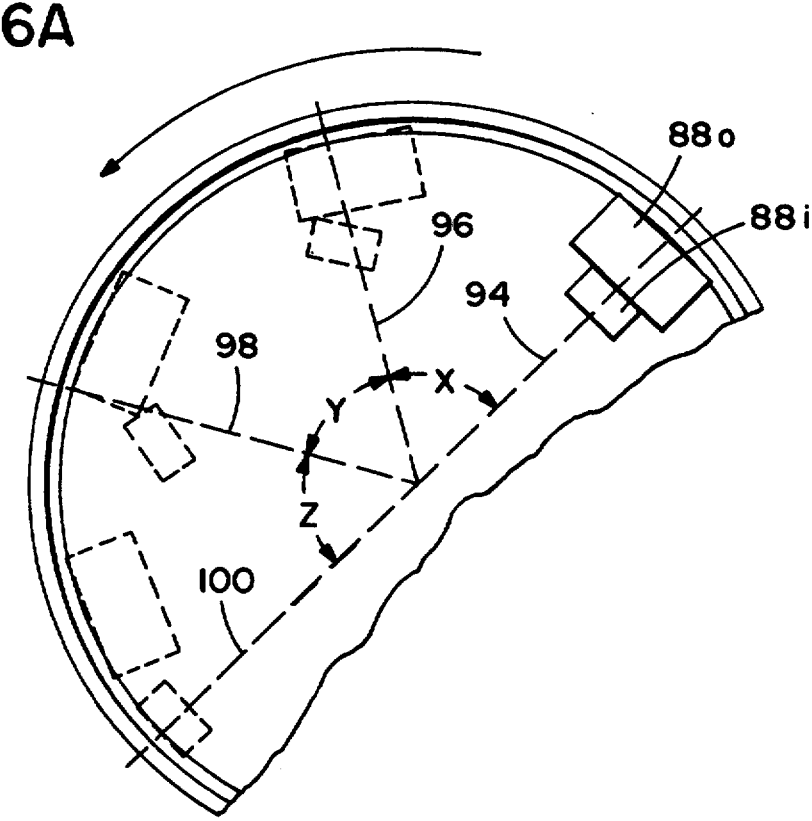
FIG. 6A is a plan view like FIG. 6 showing a pair of stacked articles being moved about the surface of the singulator device and being translated into an unstacked condition.

FIG. 6A illustrates schematically the progression of a pair of articles from a stacked arrangement to singulation along the rail. The sequence as shown is not to scale and is meant only to illustrate the relative movement between outboard article 88o and inboard article 88i. By the time conveyor 16 has rotated a certain distance as noted by angle X between radial lines 94 and 96, inboard article 88i has moved relative to outboard article 88o. This continues through angle Y (angle between radial lines 96 and 98) until inboard article 88i is no longer impeded by outboard article 88o and then comes to rest against side rail 17 like the original outboard article 88o as shown at angle Z (angle between radial lines 98 and 100).

Acceptable levels of singulation may occur at angles more or less than 180° depending upon a number of variables. However, applicant has noted that acceptable levels of singulation occurring between about 90° and 270° displacement angle are reached when the slope angle $\theta$ is between about 0° to 20° with an RPM of about 10 to 18 with a preferred RPM being about 12 to 15 RPM. The preferred slope angle $\theta$ range is between about 3° and 5°. The diameter of the conveyor is more dependent upon its application and size limitations than any other circumstance. For package sorting purposes, however, diameters of between about 10 feet and 16 feet have been found sufficient. The material of choice for a conveyor surface are generally low cost materials such as fiberglass and the like. The frictional coefficients of such materials are generally small in magnitude and are constant from application to application. Applicant has observed, however, that the range of coefficients between the articles and materials for most applications is about 0.05 to 0.15.

Figure 9:
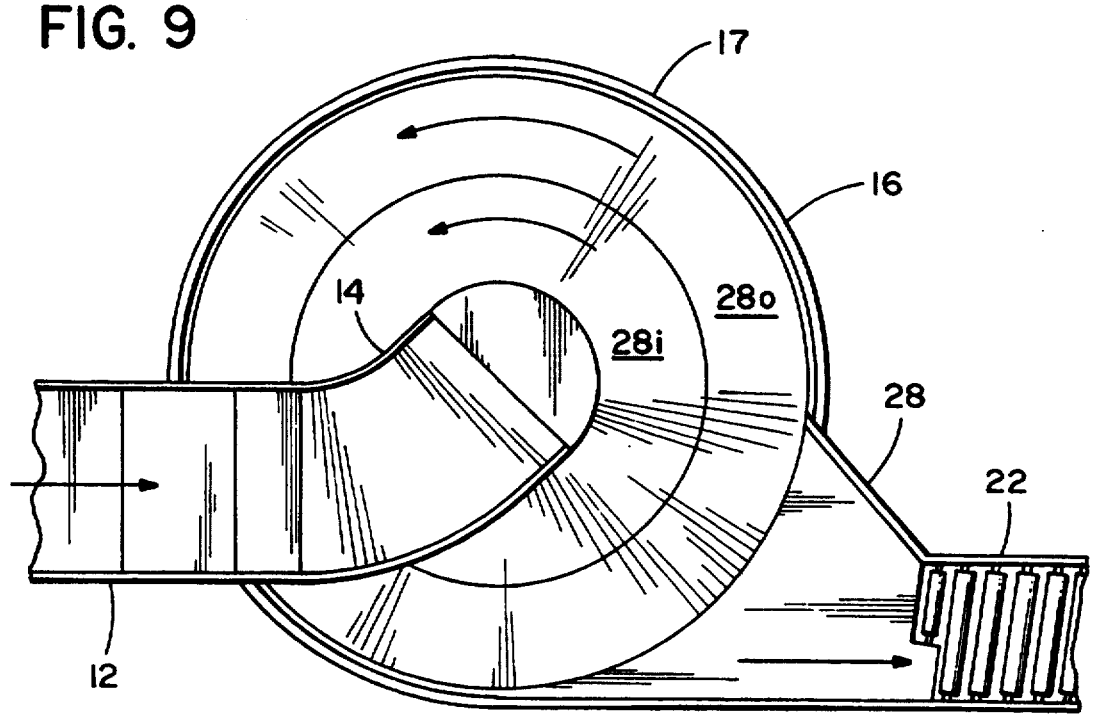
FIG. 9 is a plan view of another embodiment of the present invention showing the conical surface of the singulator device being defined by two coextensive conical surfaces, the inboard of which rotates at a different speed.
Figure 10:
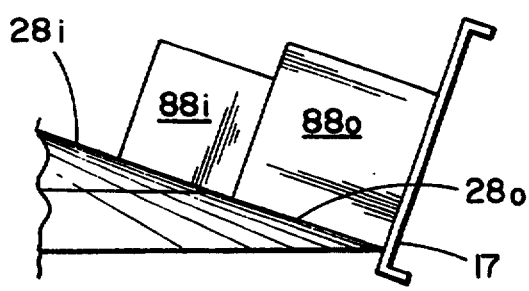
FIG. 10 is a schematic showing a pair of articles in a stacked condition in the embodiment of the conveyor of FIG. 9 and setting forth the various forces in vector form acting upon the articles.
Figure 11:
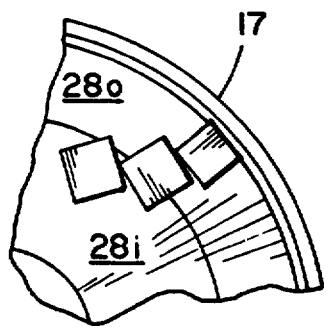
FIG. 11 is a schematic showing the translation of the inboard articles in the embodiment of FIG. 9.

FIGS. 9-12 provide schematically still another embodiment of the present invention. At times it may be desirable to provide for a singulation device in which the rotation conical surface is a plurality of surfaces rotating at different speeds to enhance the singulation of the articles. Applicant has found that the use of co-extensive surfaces rotating at different speeds is particularly appropriate when very high numbers of articles must be handled. As shown in FIG. 9, the conical surface 28 comprises a pair of surfaces 28o and 28i, the latter being known as the inboard conical surface and the former as the outboard conical surface. Inboard conical surface 28i is rotated at a different speed than outboard conical surface 28o. Additionally, outboard conical surface 28o is narrower in width and is about the width of the average article being singulated. Thus, inboard conical surface 28i tends to move the inboard articles at a different RPM, thus exaggerating the translation of the inboard articles to cause singulation in a smaller angle of displacement.

Figure 12:
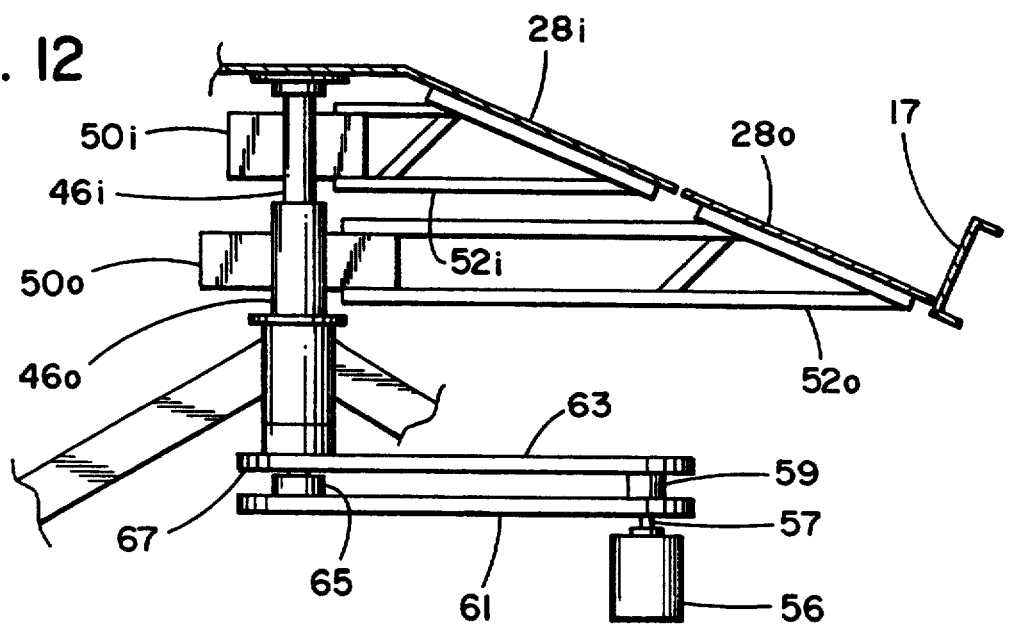
FIG. 12 is a side view in schematic form of a motor and drive mechanism for the embodiment of FIG. 9.

FIG. 12 illustrates the use of concentric shafts moving surfaces 28o and 28i driven by a pair of belts from single motor 56. Spokes 52o and brackets 50o connect shaft 46o to conical surface 28o. Similarly, spokes 52i and bracket 50i connect shaft 46i to surface 28i. Motor 56 is provided with a pair of drive pulleys 57 and 59 of different diameters driving driven pulleys 65 and 67 via respective belts 61 and 63. Shafts 46i and 46o are rotated by pulleys 61 and 63. Thus, surfaces 28i and 28o are rotated at different speeds.

Figure 13:
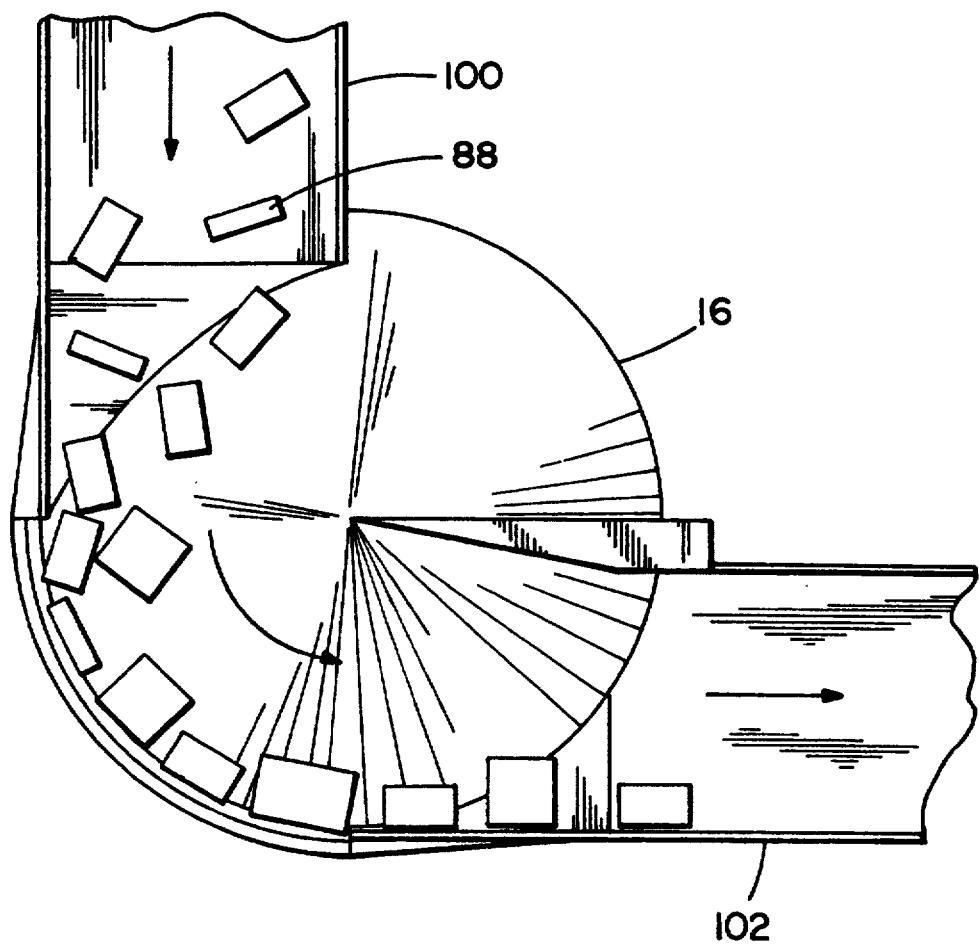
FIG. 13 is a plan view of the present invention showing the use of the truncated singulator device being used as an efficient right angle translator device for articles in a conveyor system.

In many conveyor systems because of space or operating requirements it is frequently necessary that an otherwise straight conveyor line be bent so that the articles have to be translated around bends of 90° or less. It then becomes necessary to use expensive devices to accomplish the translation. Reference is now made to FIG. 13 which illustrates the present invention's application as a high speed translating device for articles being moved from one conveyor system 100 at essentially right angles to a second conveyor system 102. As before the articles are introduced at the center top portion of surface 28 by conveyor 100 and are caused to slide down toward the rail 17 and then out onto conveyor 102 by gravity and centrifugal force. Rotating device 16 provides a very compact translating device in which articles 88 can be moved around a 90o bend or more. Additionally, singulation can be accomplished if desired.

It is understood that in light of a reading of the foregoing description and drawings that those with ordinary skill in the art will be able to make changes and modifications to the present invention without departing from the spirit or scope of the invention as defined in the following appended claims.

I claim:

1. An article singulator system for singulating articles essentially all of which have substantially parallelpiped shapes comprising
   (a) an entry conveyor;
   (b) a singulator device including a downward sloping exterior surface having the shape of a truncated upright cone that is bounded at the lower edge by a stationary impact rail, said exterior surface communicating with said entry conveyor near the upper edge of said sloping exterior surface and collectively defining therewith a region of ingress for articles to move onto said exterior surface,
   (c) a drive device for rotating said exterior surface at selected speeds of rotation ("RPM") such that articles ingressing on to said exterior surface will slide down said surface until impacting and abutting said rail and known as outboard articles or impacting and abutting said outboard articles thereby causing two or more articles to be stacked together known as stacked articles, said articles abutting said outboard articles known as inboard stacked articles, and said outboard articles being abutted by said inboard stacked articles known as outboard stacked articles, said stacked articles, said stationary rail, and said rotating exterior surface collectively generating a frictional force between said outboard stacked articles and said rail greater than the frictional force between said outboard stacked articles and said rotating sloping exterior surface thereby holding said outboard stacked articles stationary with respect to said rail until said inboard stacked articles are indexed and rotated away from abutment with said outboard stacked articles, said inboard stacked articles being indexed and rotated to said rail before being angularly displaced between about 90° to 270° from the midpoint of said region of ingress; and (d) a discharge conveyor device communicating with a chute extending from the bottom edge of said exterior surface, said chute defining a region of egress for carrying singulated articles away from said singulator device to said discharge conveyor device.

2. The system of claim 1 in which the slope angle of the exterior surface at the region of egress is greater than the slope angle at the region of ingress.

3. The system of claim 1 in which the singulator device comprises two contiguous and separately rotatable first and second surfaces defining said exterior surface, said first surface defining the upper edge and region of said exterior surface while said second surface defining the lower region and edge of said exterior surface.

4. The system of claim 3 in which said first surface is rotated at a different RPM than said second surface.

5. The system of claim 1 in which said entry conveyor includes a driven conveyor belt and an entry chute located between said belt and said singulator device, said chute being inclined downwardly from said belt toward said exterior surface and angled so as to allow said articles to enter on to said exterior surface.

6. The system of claim 1 in which said rail is essentially circular.

7. A singulator device for singulating a multiplicity of articles between a region of article ingress into the device and a region of egress from the device comprising a member having a surface forming an angle $\theta$ to a horizontal plane where said angle $\theta$ is between about 3° and 5°, said surface having a coefficient of friction of about 0.05 to 0.15 with respect to said articles;

a stationary wall circumscribing and extending above said surface and being substantially perpendicular thereto, said stationary wall having a coefficient of friction of about 0.05 to 0.15 with respect to said articles; and a motor and elements coupling said motor to said member for rotating said surface about a central axis, said surface being rotated at about 10 to 15 RPM, said articles sliding down said surface in said region of ingress with some of said articles abutting said stationary wall and other of said articles abutting said some of said articles known as inboard stacked articles, said some of said articles abutted by said inboard stacked articles known as outboard stacked articles, said inboard stacked and outboard stacked articles collectively known as stacked articles wherein said stationary wall, said stacked articles, and said rotating surface collectively create a frictional force between said outboard stacked articles and said stationary wall that is greater than the frictional force between said outboard stacked articles and said rotating surface thereby resulting in said outboard stacked articles abutting said stationary wall remaining motionless with respect to said stationary wall until said inboard stacked articles no longer abut said outboard stacked articles.

8. The device of claim 7 in which said angle $\theta$ is less at the region of ingress than at the region of egress.

9. The device of claim 7 in which said surface is a pair of co-extensive inner and outer surfaces with said outer surface being rotated at a different RPM than said inner surface.

10. The device of claim 7 in which said stationary wall is essentially circular.

11. A system for the singulation of a multiplicity of articles of various shapes and mass comprising (a) an inlet device for moving the articles into said system, (b) an outlet device for discharging the articles from said system, (c) a rotary member having a downwardly sloping truncated conical surface from said inlet device to said outlet device forming a slope angle with a horizontal plane and a side rail circumferentially disposed about a bottom edge of said conical surface and stationary with respect thereto, (d) motor and elements coupling said motor to said rotary member for rotating said conical surface at a predetermined number of revolutions per minute, said articles when moving on to said rotating conical surface moving down said surface due to the force of gravity and centrifugal force of the rotation of said surface and forming various arrangements of articles wherein some of the articles abut said rail and are called outboard articles and some of the articles impact against and abut some of said outboard articles and are called inboard stacked articles, said some of said outboard articles abutted by said inboard stacked articles being known as outboard stacked articles, said slope angle and said RPM being provided values such that each of said (i) outboard articles fulfill the condition $$F_r < F_{so}$$

where $F_r$ is the frictional force between said rail and the outboard article and $F_{so}$ is the frictional force between said conical surface and said outboard article whereby said outboard article rotates with said conical surface, (ii) said outboard stacked articles fulfill the condition $$F_{rc} > F_{so}$$

where $F_{rc}$ is the frictional force between said rail and the outboard stacked article whereby each of said outboard stacked articles is essentially motionless with respect to said side rail, and (iii) said inboard articles fulfill the condition $$F_{io} < F_{is}$$

where $F_{io}$ is the frictional force between said outboard stacked article and said inboard stacked articles and $F_{is}$ is the frictional force between said conical surface and said inboard articles whereby each of said inboard articles is translated in the direction of rotation of said conical surface.

* * * * *

UNITED STATES PATENT AND TRADEMARK OFFICE
CERTIFICATE OF CORRECTION

PATENT NO. : 5,372,236
DATED : December 13, 1994
INVENTOR(S) : John K. Layer

It is certified that error appears in the above-indentified patent and that said Letters Patent is hereby corrected as shown below:

In the Abstract, line 6, $-200°-$ should read $--20°--$

Signed and Sealed this

Twenty-first Day of February, 1995

Attest:

BRUCE LEHMAN

*Attesting Officer*     *Commissioner of Patents and Trademarks*